(12) United States Patent
Marseille et al.

(10) Patent No.: US 12,478,715 B2
(45) Date of Patent: Nov. 25, 2025

(54) CONTROL OR REGULATING DEVICE

(71) Applicant: Hemovent GmbH, Aachen (DE)

(72) Inventors: Oliver Marseille, Aachen (DE); Jürgen Korthauer, Alpen (DE); Markus Weber, Spring Valley, CA (US); Stefan Nötzel, Aachen (DE)

(73) Assignee: Hemovent GmbH, Aachen (DE)

( * ) Notice: Subject to any disclaimer, the term of this patent is extended or adjusted under 35 U.S.C. 154(b) by 1145 days.

(21) Appl. No.: 16/975,307

(22) PCT Filed: Feb. 26, 2019

(86) PCT No.: PCT/EP2019/054723
§ 371 (c)(1),
(2) Date: Aug. 24, 2020

(87) PCT Pub. No.: WO2019/162525
PCT Pub. Date: Aug. 29, 2019

(65) Prior Publication Data
US 2021/0379258 A1    Dec. 9, 2021

(30) Foreign Application Priority Data

Feb. 26, 2018 (DE) .................... 10 2018 001 467.4
Jul. 3, 2018 (LU) ....................................... 100849

(51) Int. Cl.
*A61M 1/16* (2006.01)
*A61M 1/36* (2006.01)

(52) U.S. Cl.
CPC ........ *A61M 1/1698* (2013.01); *A61M 1/1601* (2014.02); *A61M 1/3623* (2022.05); *A61M 1/3666* (2013.01); *A61M 2205/3334* (2013.01)

(58) Field of Classification Search
CPC .............. A61M 1/1698; A61M 1/1601; A61M 1/3623; A61M 1/3666; A61M 2205/3334
See application file for complete search history.

(56) References Cited

U.S. PATENT DOCUMENTS

| | | | |
|---|---|---|---|
| 4,116,589 | A | 9/1978 | Rishton |
| 4,828,543 | A | 5/1989 | Weiss et al. |
| 5,810,759 | A | 9/1998 | Merz |
| 2002/0057989 | A1 | 5/2002 | Afzal et al. |
| 2005/0004480 | A1 | 1/2005 | Kirchhof |
| 2005/0027231 | A1 | 2/2005 | Kirchhof |
| 2013/0004369 | A1 | 1/2013 | Marseille |
| 2015/0034082 | A1 | 2/2015 | Kimm et al. |

(Continued)

FOREIGN PATENT DOCUMENTS

| | | |
|---|---|---|
| CN | 1550239 A | 12/2004 |
| CN | 102743802 | 10/2012 |

(Continued)

OTHER PUBLICATIONS

PCT/EP2019/054723 Search Report & Written Opinion dated Jun. 18, 2019.

*Primary Examiner* — Leslie R Deak
(74) *Attorney, Agent, or Firm* — Michael J. Brown

(57) ABSTRACT

The invention concerns a control or regulating device with a control or regulating unit, which both controls or regulates a volumetric blood flow flowing through a blood pump as well as a volumetric flow of a gas able to flow through a gas exchange unit.

18 Claims, 15 Drawing Sheets

(56) References Cited

U.S. PATENT DOCUMENTS

2017/0252505 A1    9/2017   Wu et al.
2017/0368247 A1    12/2017   Turner

FOREIGN PATENT DOCUMENTS

| | | | |
|---|---|---|---|
| CN | 106178159 A | 12/2016 | |
| CN | 107073196 A | 8/2017 | |
| JP | 2002533184 A | 10/2002 | |
| JP | 2002536126 A | 10/2002 | |
| JP | 2015167721 A | 9/2015 | |
| JP | 2017536198 A | 12/2017 | |
| WO | WO-2016100512 A1 | 6/2016 | |
| WO | WO-2019162525 A1 | 8/2019 | |
| WO | WO-2020163596 A1 * | 8/2020 | .......... A61M 1/1698 |

\* cited by examiner

CONTROL OR REGULATING DEVICE

CROSS-REFERENCE

This application is a national stage entry of PCT Application No. PCT/EP2019/054723, filed Feb. 26, 2019; which claims priority to German Application No. 10 2018 001 467.4, filed Feb. 26, 2018; and claims priority to Luxembourg Application No. 100849, filed Jul. 3, 2018; which are incorporated herein by reference in their entirety and to which application we claim priority under 35 USC § 120.

BACKGROUND

The invention concerns a control or regulating device. Furthermore, the invention concerns a heart-lung machine with a control or regulating device.

Patients with heart failures or lung failures can be kept safe or alive by a heart-lung support used extracorporeally before the condition worsens further. Firstly, stress is removed from the heart or the lungs so that they are available for treatment, while, at the same time, their organs continue to function by means of external support. For this, the patient is connected by suitable tubes to an extracorporeal circuit which ensures that the heart and lungs continue to function.

A heart-lung machine consists of a blood pump and an artificial lung. The blood is removed through a peripheral or central access with tubes from the venous vessel system and, after being enriched with oxygen, is returned again on the venous or arterial side. In this way, the life-supporting organs are supplied with fresh blood, while the patient can be transported or taken for further treatment. Generally, the blood pump is connected solidly to an operator's console and the operating power is transferred through a magnetic coupling by a pump motor to a rotor in the blood pump. Roller pumps are used also in which a pump pipe is placed in the operator's console. The artificial lung, also called an oxygenator or gas exchanger, is located in the flow direction beyond the blood pump.

The conventional control units for the blood pump monitor the pumping function of the system regarding the amount of blood flowing, the blood pressures and give a warning if necessary. The blood flow is adjusted by the revolutions of the pump by the operator at the control unit.

The gas supply of the oxygenator is assured by a gas blender separate from the control unit which is supplied with oxygen and compressed air. The gas flow amount and composition are selected, depending on need. In some instances, the oxygenator is also supplied with oxygen only at a desired volumetric flow by a throttle device.

A disadvantage with the known heart-lung machines is that the provision of the gas supply, which is equally as important in the treatment as the control of the blood flow, is spatially separated and, as a consequence, is made difficult and cannot be monitored. This affects the safety of the patient and the quality of the treatment. When an oxygen source with a throttle device is used clinically in the conventional manner, there is, moreover, no alarm function or information about the functioning of the gas source. There is a further disadvantage in that heart-lung machines consist of a large number of components. This makes the transportation of the heart-lung machine and its operation more difficult.

Therefore, a task of the invention is to improve the safety and quality of treatment, as well as simplifying the transportation of the heart-lung machine.

SUMMARY

The task is resolved by a control or regulating device which has a control or regulating unit, which both controls or regulates the volume of blood flowing through a blood pump as well as a volumetric flow of a gas flowing through a gas exchange unit.

The control or regulating device according to the invention is advantageous in that both the amount of blood flowing as well as the volumetric gas flowing through the gas exchange unit can be adjusted by a single device. This increases the operating safety, the monitoring of the treatment, and makes it easier to transport and operate the heart-lung machine. In particular, it is no longer necessary to move two devices, separate from one another, just simply a single device, i.e. the control or regulating device. A further advantage of the control or regulating device according to the invention is that the essential operating steps take place on one device wherein errors in operation, particularly when starting up, are avoided.

The control and regulating device comprises a compact device, in particular with a housing, to which the blood-carrying disposable components pump and gas exchanger are directly connected and are supplied with energy or respectively gas. Further connections or supplementary devices are not needed. The supply to the device is done through one gas connection only and, if necessary, through a power grid connection. The regulation of the pump and gas metering are incorporated in the device. Therefore, a separate pump console or gas flow control is not necessary. The device is designed to be portable.

In a variant of the device, to drive the blood pump, the reusable actuator such as an electric motor, can be disposed outside the housing and, for example, can be connected to said actuator with a cable.

In one embodiment, the device can have a housing volume of less than 2 litres and a weight of less than 2 kg. Because its structure is compact and light, this variant of the device is particularly good for being carried by patients. Also, because of the compact construction, it can be positioned very close to the patient.

The gas can consist of a single-use gas. Alternatively, the gas can be a mixture of gases consisting of several individual gases and/or an individual gas and one or several further gas(es).

With a special embodiment, the control or regulating unit can be designed in such a way and be intended, in controlling or regulating the volumetric flow of blood, to drive, electrically and/or pneumatically, the blood pump not belonging to the control or regulating device. In this case, the blood pump is designed as a centrifugal pump which is controlled or regulated electrically via a speed control or pneumatically via a gas supply control. The volumetric flow of blood expedited by the blood pump depends on the speed control and/or the gas supply control. The blood pump can be a pump using a suction or pulsing flow.

According to another, independently inventive, aspect, the control or regulating unit can control or regulate the volumetric gas flow flowing through the gas exchange unit not belonging to the control or regulating device dependently or independently of the volumetric blood flow, in particular, automatically. In particular, the control or regulating unit can control the volumetric gas flow particularly dependent on a previously adjusted volumetric blood flow. Thus the volumetric blood flow can be adjusted in terms of time before the control or regulation of the volumetric gas flow by the user, for instance by operating a control knob. In the case of automatic control based on the blood flow, in particular, there must be no more manual adjustment of the gas flow.

In this case, the control or regulating unit can control and regulate the volumetric gas flow and/or the volumetric blood flow such that a defined relationship can be set between the volumetric gas flow and the volumetric blood flow. In addition, the control or regulating unit can at least have the possibility to provide an input, by means of which a user can input the desired relationship. Alternatively or additionally, the control or regulating unit can control and regulate the volumetric blood flow and/or the volumetric gas flow such that a temporally changeable relationship, or relationship that can be influenced by measurement parameters between the volumetric gas flow and the volumetric blood flow can be adjusted.

When the volumetric blood flow is changed, the control or regulating unit is able to control or regulate the volumetric gas flow automatically to a value in keeping with the volumetric blood flow. Thus, it is not necessary that the user continuously monitors the volumetric blood flow and has to intercede when changes in the volumetric blood flow occur. In particular, the user can input the desired relationship between the volumetric gas flow and the volumetric blood flow once and the control or regulating device will adjust the volumetric gas flow automatically to a new volumetric blood flow. Since there is just a single control or regulating device which controls or regulates the volumetric gas flow and the volumetric blood flow, the user has to input the desired relationship just in one single device, which simplifies the use. Furthermore, when switching on the blood pump and a volumetric blood flow associated with it, the control or regulating unit simultaneously controls or regulates the volumetric gas flow to a value which is associated by the blood pump with a required volumetric blood flow.

Also, at least one algorithm can be stored which controls or regulates the relationship of volumetric gas flow and volumetric blood flow. Based on a specification or change in the volumetric blood flow by the user, the control and regulating unit adjusts the volumetric gas flow to the gas exchanger. For this, the device needs no external sensors, such as for blood gas monitoring, but simply makes use of the blood flow rate set by the user.

Control does not need electronic components. The gas flow through the gas exchanger can be controlled by mechanical or pneumatic coupling in relation to the blood flow setting device (control knob for blood flow).

The control or regulation can also be carried out depending on the time or other measurement parameters. At least one algorithm can be stored in an electrical storage unit of the control or regulating device.

The gas exchange unit can be an oxygenator. An oxygenator is a unit by means of which the blood can be enriched with oxygen and carbon dioxide can be removed from the blood. Thus, by means of the oxygenator, the lung is replaced or assisted both instantaneously as well as over longer time periods.

In one particular embodiment, the control or regulating unit can have a mixing device. At least two gases can be mixed together in the mixing device. In particular, oxygen can be mixed with air, particularly compressed air, in the mixing device. Furthermore, in individual cases it is possible that mixing in the mixing device can take place between oxygen and air, particularly compressed air, and/or with another gas, such as $CO_2$ (carbon dioxide) and/or NO (nitric oxide). The gas flowing out of the mixing device can be supplied to the gas exchange unit.

The control or regulating unit can also have an adjusting device by means of which it is possible to adjust a volumetric flow and/or a composition of the gas flowing out of the mixing device. Thus, by means of the adjusting device, it is easy for the user to set the required volumetric flow and/or the composition of the gas flowing out of the mixing device. The adjusting device can have several control knobs by means of which the volumetric flow and/or the composition of the gases can be adjusted particularly separately. Alternatively, the adjusting device can have a touch display by means of which the user can enter the desired inputs. As a result, using the mixing device and the adjusting device, the volumetric flow and the composition of the gas can be adjusted simply, wherein said gas flows from the mixing device to the gas exchange device. Furthermore, the volumetric gas flow supplied through the adjusting device to the gas exchange unit can be easily controlled or regulated.

The gases supplied to the mixing device can derive from several different gas sources not associated with the control or regulating device. The gas sources are connected fluidically to the control or regulating device. In this arrangement, oxygen is supplied to the control or regulating device by means of a first source. A second source supplies air, particularly compressed air to the control or regulating device. Furthermore, a third source can be present, by means of which oxygen can be supplied also to the control or regulating device. The third source serves as an emergency reserve in case the first source fails. Additional mixing gases can be supplied from other sources.

Furthermore, the control or regulating unit can have a further mixing device for mixing gas and ambient air. In particular, oxygen can be mixed with ambient air in the further mixing device. In order to draw in the ambient air, the further mixing device can have a venturi element. The gas flowing out of the further mixing device can be supplied to the gas exchange unit.

The control or regulating unit can have a further adjusting device by means of which a volumetric flow and/or a composition of the gases flowing out of the further mixing device can be adjusted. The further adjusting device can have several control knobs by means of which the volumetric flow and/or the composition of the gas can be adjusted. Alternatively, the adjusting device can have a touch display by means of which the user is able to enter the desired inputs. As a result, the volumetric flow and the composition of the gas can be adjusted easily by the further mixing device and the further adjusting device, said composition of gases flowing from the further mixing device to the gas exchange unit. Furthermore, the volumetric gas flow supplied to the gas exchange unit can be easily controlled or regulated by the further adjusting device.

In the case of a particular embodiment, the control or regulating unit can have another adjusting device by means of which a volumetric flow of the gases flowing to the blood pump can be controlled or regulated. This is offered in embodiment in which the blood pump is driven pneumatically. The blood pump is controlled by the gas such that a pumping function is affected and, thus, the volumetric blood flow is encouraged. Thus, the volumetric blood flow can be simply controlled or regulated by means of the adjusting device.

The other adjusting device can be disposed upstream of the blood pump. Oxygen can be supplied exclusively to the blood pump. There is no intermixing of the gas supplied to the blood pump with another gas before it is supplied to the blood pump. Thus, no adjusting device is needed either by means of which the composition of the gas flowing to the blood pump can be adjusted.

The control or regulating unit can have a switching device which is connected fluidically to the blood pump and can be connected fluidically to the gas exchange unit. The switching device can be disposed downstream of the blood pump in the gas flow direction and/or upstream of the gas exchange unit in the gas flow direction. Two components are connected together fluidically if a gas and/or a fluid can flow from one component to the other component and vice versa. By means of the switching device, an adjustment can be made whether the gas flowing from the blood pump is optionally supplied to the gas exchange unit or is released into the environment. The environment can also mean a cavity of a housing of the control or regulating unit.

In one switch setting of the switching device, the blood pump can be fluidically connected to the gas exchange unit by means of the switching device. Thus, the gas flowing out of the blood pump can flow through the switching device and flow further towards the gas exchange unit. In another setting of the switching device, the blood pump can be fluidically connected to the environment. This means that, in the other switch setting, gas flowing into the switching device is released completely into the environment.

The control or regulating unit can have a switch adjusting device. The switch adjusting device serves to control or regulate a volumetric flow of the gas supplied from the switching device to the gas exchange unit. Thus, in a simple manner, the volumetric flow can be set which supplies the gas exchange unit. This is particularly necessary to avoid respiratory alkalosis of the patient which can occur if too much carbon dioxide is removed in the gas exchange unit. In this case, the switch adjusting device can be arranged such that the part of the gas not supplied to the gas exchange unit is released to the environment.

In a particular embodiment, the control or regulating unit can have a selection device by means of which the optionally different operating modes of the control or regulating device can be adjusted. Thus, by means of the selection device, a first operating mode can be selected in which the switching device is placed in the switch position so that the same gas can be supplied both to the blood pump as well as to the gas exchange unit. In particular, in this operating mode, pure oxygen can be supplied to both the blood pump as well as to the gas exchange unit. The first operating mode is suitable for individual cases in which the blood in the gas exchange unit has to be enriched with a lot of oxygen. The gas supplied to the gas exchange unit can be released to the environment after the blood has been enriched with oxygen.

A second operating mode can be set by means of the selection device, in which the switching device is in the other switch position and in which the gas flowing out of the mixing device is supplied to the gas exchange unit. In this operating mode, the gas supplied from the blood pump to the switching device is released completely to the environment. With the second operating mode, the advantage lies in the fact that the concentration of oxygen in the gas supplied to the gas exchange unit can be adjusted in the mixing device. Thus, it is easy to prevent blood in the gas exchange unit being enriched with too much oxygen. With the second operating mode, different gases are supplied to the blood pump and the gas exchange unit. A gas is supplied to the blood pump, such as a mixture of oxygen and compressed air, while gas, such as a mixture of oxygen and compressed air, flowing out of the mixing device is supplied to the gas exchange unit.

Furthermore, the selection device enables a third operating mode to be selected in which the switching device is disposed in the other switch position and in which the gas flowing out of the mixing device is supplied to the gas exchange unit. In this situation, a gas mixture can be supplied to the gas exchange unit, said mixture consisting of oxygen and ambient air. Thus, in the case of the third operating mode as with the second operating mode, various gases are supplied to the blood pump and the gas exchange unit. The third operating mode is better suited to individual cases wherein the user does not have access to compressed air. This is often the case if the heart-lung machine is used outside the hospital.

In a particular embodiment, the control and regulating device can have a safety device. The safety device can serve to monitor the operation of the control and regulating device. Thus, deviations from normal operation can be detected by suitable sensors or pneumatic-electrical switches and/or an alarm can be given by means of the safety device. The safety device can be supplied with standard or rechargeable batteries, thus making them independent of the electricity supply.

The alarms may inform the user acoustically and/or optically. Alarms can be issued if the gas pressure being supplied falls below a threshold value, the control or regulating device is being driven only with one gas source, or the blood pump or the operation of the gas exchange unit is deviating from normal operation.

In this system, an alarm can also be issued if the volumetric flow of the gas supplied to the gas exchange unit falls below a threshold. Thus, the user can be informed in a simple manner that the volumetric gas flow is too low.

Also, a connection on the control or regulating device can be coupled to a central monitoring unit in the hospital. This can be accomplished by a simple connection with an on/off contact via the central nurse call switch.

Furthermore, the control or regulating device can have a monitoring device to monitor the patient's vital parameters. As a consequence, a control or regulating device is available which offers a large number of functions.

The control or regulating unit can also serve to control and regulate the temperature of the blood. Thus, the heart-lung machine can have a heating or cooling device to heat up or cool down the blood taken from the patient. The control or regulating unit can control or regulate the heating or cooling in such a way that the temperature of the blood is at the desired temperature. Warming the blood is needed when the tubes connected to the patient are very long and/or the temperature of the environment is very low so that the temperature of the blood flowing in the tubes falls. Cooling can be sought for treatment purposes to protect the patient's organs. Cooling can be accomplished by chemical cooling and/or by a phase transition. Alternatively, cooling can be carried out in other ways.

In a particular embodiment, the control or regulating unit can have a gas connection unit which can be connected fluidically to the gas source or to several gas sources. The gas connection unit can have several connections, each of which can be fluidically connected to a gas source. The gas connection unit can be fluidically connected to the mixing device and/or to the further mixing device.

The control or regulating unit can have a further switching device. The gas connection unit can be fluidically connected optionally to the mixing device or to the further mixing device by means of the further switching device. Thus, in a first switch position of the further switching device, the gas connection unit is fluidically connected to the mixing device. In particular, at least two gas sources, such as the first source and the second source, can be fluidically connected to the mixing device. In this case, oxygen and air, in particular compressed air, can be supplied to the mixing device. Furthermore, the further switching device can be configured such that is has a closed position in which neither the mixing device nor the further mixing device are fluidically connected to the gas connection unit.

In a second switch position of the further switching device, the gas connection unit can be fluidically connected to the further mixing device. In particular, the further mixing device can be fluidically connected to a gas source, in particular a single gas source. In this situation, in the second switch setting, the further mixing device can be supplied exclusively with oxygen. The further switching device can also be configured and made such that, regardless of its position, the other adjusting device is always fluidically connected to the gas connection unit. This ensures that gas, such as oxygen, is always being supplied to the other adjusting device, said gas being used to drive the pump.

Furthermore, the further switching device can be arranged such that, if a gas source fails, another gas source is switched on automatically. This is offered, for example, if the first source no longer has sufficient oxygen available and the supply of oxygen to the gas exchange unit is not ensured. In this case, the gas connection unit switches automatically to the third source which also has oxygen available. As a consequence, it is easy to arrange that sufficient gas, such as oxygen, is constantly being supplied to the further switching device.

Furthermore, the control or regulating unit can have a pressure control valve by means of which the blood pump is prevented from supplying too high a volumetric gas flow. Moreover, the control or regulating unit can have another pressure control valve by means of which too high a volumetric gas flow is prevented from being supplied to the gas exchange unit.

The control or regulating can have a housing which has a handle. Using the handle, the control or regulating device can be carried easily. Furthermore, the housing can be configured in such a way that the control or regulating unit is arranged at least partly, in particular fully, inside a cavity of the housing. The adjusting device, the further adjusting device and the other adjusting device can be disposed on the same side of the housing.

A heart-lung machine is particularly advantageous with a blood pump, a gas exchange unit and an inventive control or regulating device. The control or regulating device is fluidically connected to the blood pump and the gas exchange unit. Furthermore, the control or regulating device is fluidically connected to several gas sources.

BRIEF DESCRIPTION OF THE DRAWINGS

The inventive item is shown diagrammatically in the Figures and is described below with the aid of the Figures wherein identical or equivalent elements are provided with the same reference symbols for the most part. They show, in.

DETAILED DESCRIPTION

Figure 1:
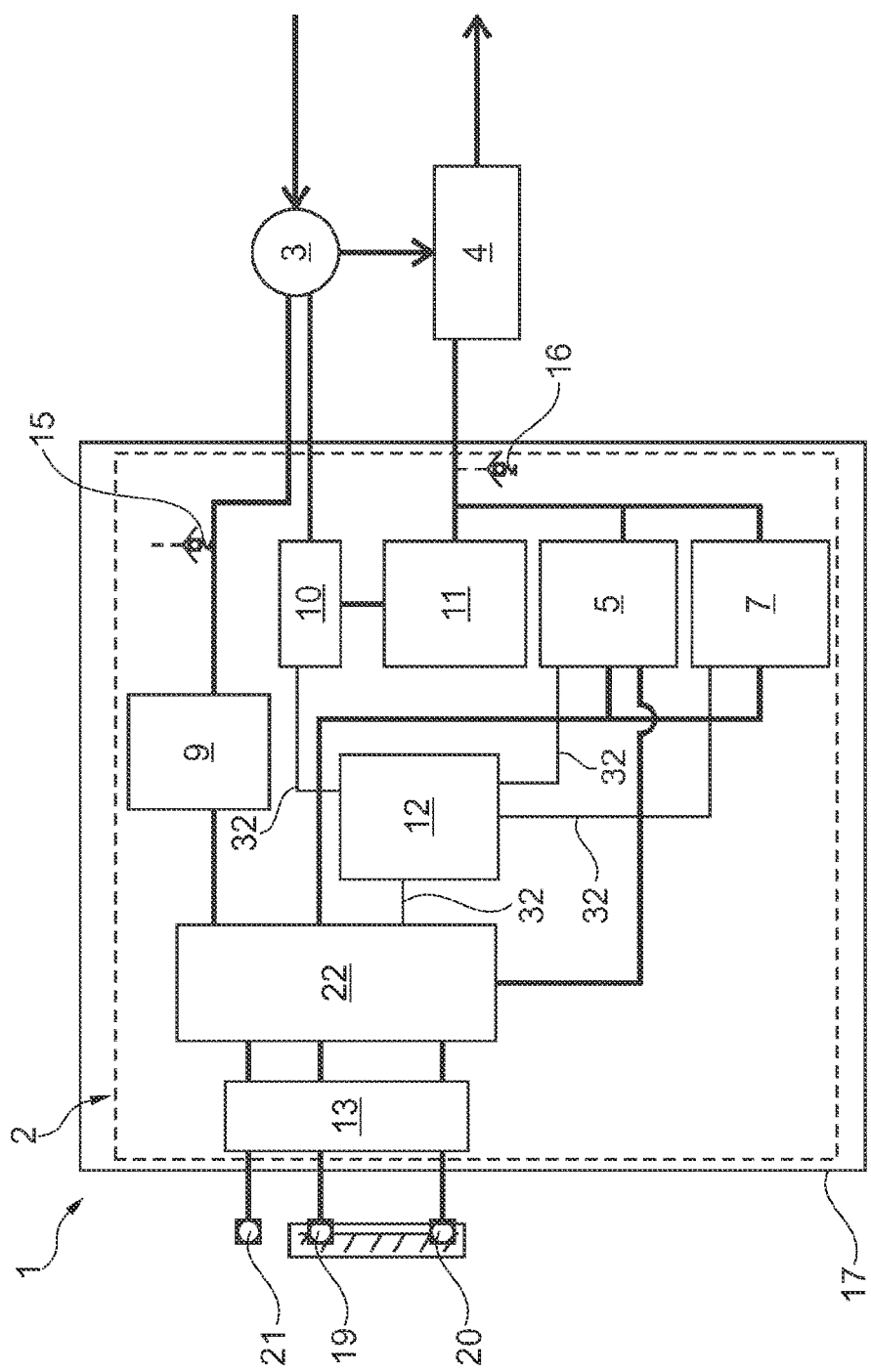
FIG. 1 a depiction of a heart-lung machine with an inventive control or regulating device according to a first embodiment, FIG. 2 a depiction of the heart-lung machine with the inventive control or regulating device according to the first embodiment, wherein the control or regulating device is operated in a first operating mode, FIG. 3 a depiction of the heart-lung machine with the inventive control or regulating device according to the first embodiment, wherein the control or regulating device is operated in a second operating mode, FIG. 4 a depiction of the heart-lung machine with the inventive control or regulating device according to the first embodiment, wherein the control or regulating device is operated in a third operating mode, FIG. 5 a depiction of the further mixing device, FIG. 6 a depiction of the inventive control or regulating device according to a second embodiment, FIG. 7 a depiction of the heart-lung machine with the inventive control or regulating device according to a third embodiment, FIG. 8 a depiction of the inventive control or regulating device according to a fourth embodiment, FIG. 9 a depiction of the inventive control or regulating device according to a fifth embodiment, FIG. 10a depiction of the inventive control or regulating device according to a sixth embodiment, FIG. 11a depiction of the inventive control or regulating device according to a seventh embodiment, FIG. 12a depiction of the inventive control or regulating device according to an eighth embodiment, FIG. 13a depiction of the heart-lung machine with the inventive control or regulating device according to a ninth embodiment, FIG. 14a depiction of the heart-lung machine with the inventive control or regulating device according to the ninth embodiment, shown with no fluidic connections, FIG. 15a perspective depiction of the inventive control or regulating device according to the ninth embodiment.

FIG. 1 shows a depiction of a heart-lung machine with an inventive control or regulating device 1, a blood pump 3 and a gas exchange unit 4, such as an oxygenator. The control or regulating device 1 has a control or regulating unit 2 which controls or regulates both a volumetric blood flow being supplied by the blood pump 3 as well as a volumetric flow of gas flowing through the gas exchange unit 4. The control or regulating unit 2 is disposed in a cavity of a housing 17 of the control or regulating device 1.

The control or regulating unit 2 has a gas connection unit 13 which serves to connect the control or regulating device 1 fluidically with several gas sources. To do this, the gas connection unit 13 has several connections which are each connected to the gas sources with a fluid line.

Thus, the gas connection unit 13 is fluidically connected with a first source 19. Oxygen can be supplied to the control or regulating device 1 by means of the first source 19. Furthermore, the gas connection unit 13 is fluidically connected to a second source 20. Air, in particular compressed air, can be supplied to the control or regulating device 1 by means of the second source 20. Furthermore, the gas connection unit 13 is fluidically connected to a third source 21. Oxygen can be supplied to the control or regulating device 1 also by means of the third source 21. The first and second sources 19, 20 are incorporated, for example, in a wall of a hospital room. The third source 21 can be, for example, a gas bottle and serving as an emergency supply if the first source 19 fails. Further gas sources, not shown in the drawings, can exist, which can be connected to the control or regulating device 1.

The control or regulating unit 2 can have a mixing device 5 which serves to mix oxygen deriving from the first source 19 or the third source 21 with the compressed air deriving from the second source 20. In this arrangement, the control or regulating unit 2 has an adjusting device 6 shown in FIG. 6 by means of which the composition of the gases flowing out of the mixing device 5 can be controlled or regulated. Moreover, the volumetric flow of the gas, which is supplied to the gas exchange unit 4 disposed downstream, flowing out of the mixing device 5 can be controlled or regulated by means of the adjusting device 6. The adjusting device 6 has several control knobs by means of which the composition and the volumetric flow can be adjusted.

The control or regulating unit 2 can also have a further mixing device 7 which serves to mix the oxygen, supplied by the first source 19 or the third source 21, with ambient air. To do this, the control or regulating unit 2 has a further adjusting device 8 shown in FIG. 6 by means of which the composition of the gas flowing out of the further mixing device 7 can be controlled or regulated. Moreover, the volumetric flow of the gas, which is supplied to the gas exchange unit 4 disposed downstream, flowing out of the further mixing device 7 can be controlled or regulated by means of the further adjusting device 8. The further adjusting device 8 has several control knobs by means of which the composition and the volumetric flow can be adjusted.

Furthermore, the control or regulating unit 2 has another adjusting device 9 which is disposed upstream of the blood pump 3 in the gas flow and/or which is permanently fluidically connected to the gas connection unit 13. The volumetric flow of the gas supplied to the blood pump 3 can be controlled or regulated by means of the other adjusting device 9. In this arrangement, oxygen can be supplied exclusively to the blood pump 3, flowing first from the first source 19 or from the third source 21. The oxygen supplied to the blood pump 3 is fed back into the control or regulating device 1. A pumping action is created by the inflow and outflow of oxygen to the blood pump 3 which causes a volumetric blood flow. In doing so, a pressure control valve 15 is disposed fluidically between the other adjusting device 9 and the blood pump 3. The pressure control valve 15 can prevent too high a volumetric gas flow being supplied to the blood pump 3.

The flow course of the blood is illustrated only diagrammatically in FIG. 1. Here, the blood taken from the patient flows into the blood pump 3 and from there to gas exchange unit 4. In the gas exchange unit 4, the blood is enriched with oxygen and flow back to the patient. The flow course of the blood is illustrated in FIG. 1 by three arrows.

The control or regulating unit 2 has a switching device 10 which is disposed downstream from the blood pump 3 and upstream ahead of the gas exchange unit 4. In one switch position of the switching device 10, the blood pump 3 is fluidically connected to the gas exchange unit 4. In another switch position of the switching device 10, the volumetric gas flow deriving from the blood pump 3 can be released completely into the environment.

A switch adjusting device 11 is disposed fluidically between the switching device 10 and the gas exchange unit 4. The volumetric gas flow supplied to the gas exchange unit 4 can be controlled or regulated by means of the switch adjusting device 11. The switch adjusting device 11 is designed such that a part of the volumetric gas flow, which is not intended to supply the gas exchange unit 4, flowing from the blood pump 3, is released into the environment.

Another pressure release valve 16 is disposed upstream of the gas exchange unit 4. The supply of too large a volumetric gas flow to the gas exchange unit 4 can be prevented by means of the other pressure control valve 16. The volumetric gas flow supplied into the gas exchange unit 4 is released into the environment after enriching the blood with oxygen.

The control or regulating unit 2 has a further switching device 22. The gas connection unit 13 optionally is fluidically connected to the mixing device 5 or the further mixing device 7 by means of the further switching device 22. Furthermore, the mixing device 5 is designed such that the gas connection unit 13 is fluidically connected, in particular permanently, to the other adjusting device 9. In particular, the other adjusting device 9 can be fluidically connected permanently to the first source 19 or the third source 21. The further mixing device 7 is also configured such that it switches over automatically to the third source 21 if the first source 19 fails.

The control or regulating unit 2 also has a selection device 12 by means of which the different operating modes described in more detail below can be set. The selection device 12 is electrically connected to the switching device 10, the further switching device 22, the mixing device 5 and the further mixing device 7 in each case by means of an electrical line 32. The position of the switching device 10 and/or the further switching device 22 depends on the position of the selection device 12.

Figure 2:
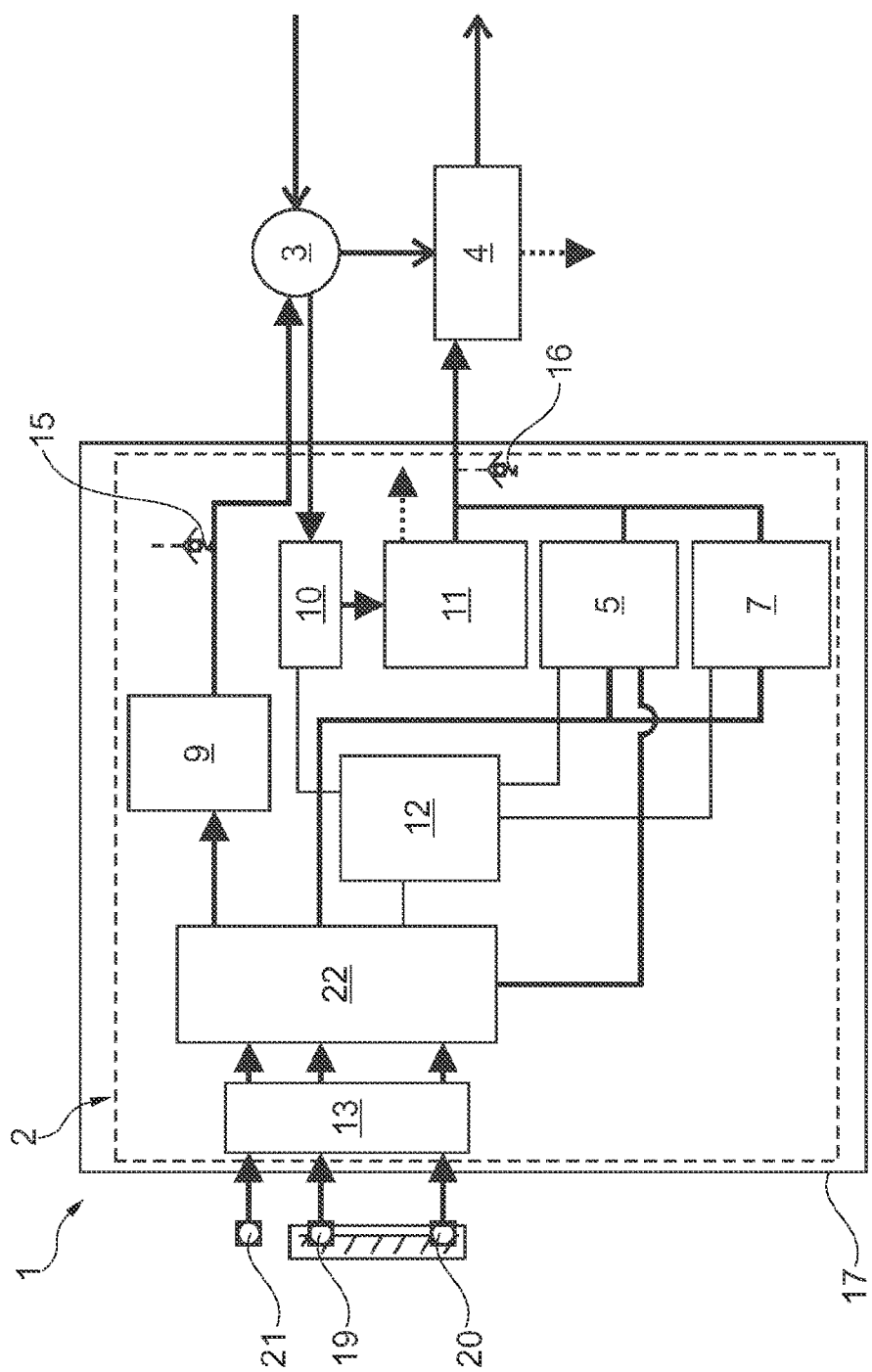

FIG. 2 shows a depiction of the heart-lung machine with the inventive control or regulating device 1 according to the first embodiment, wherein the control or regulating device 1 is operated in a first operating mode. The first operating mode can be selected wherein the user actuates the selection device 12 appropriately, in particular by turning a knob of the selection device 12 to a corresponding position.

In FIG. 2, the lines through which a gas flows are illustrated with an arrow. Accordingly, in the first operating mode oxygen flows out of the gas source into the gas connection unit 13 and from there to the other adjusting device 9. Departing from the other adjusting device 9, the oxygen flows to the blood pump 3 and from there back into the control or regulating device 1. In particular, the oxygen flows from the blood pump 3 into the switching device 10. The switching device 10 is located in the switch position, so that the gas flows further to the switch adjusting device 11. The switch adjusting device 11 is set such that a part of the gas flowing out of the switching device 10 is released into the environment, which is illustrated by the dotted arrow. The part not released into the environment flows to the gas exchange unit 4. The part of the gas flowing through the gas exchange unit 4 is released into the environment, which is indicated by the dotted arrow.

In the first operating mode, the further switching device 22 is in a closed position, wherein the gas is supplied to neither the mixing device 5 nor the further mixing device 7. Furthermore, gas flows neither from the mixing device 5 nor from the further mixing device 7 to the gas exchange unit 7.

Figure 3:
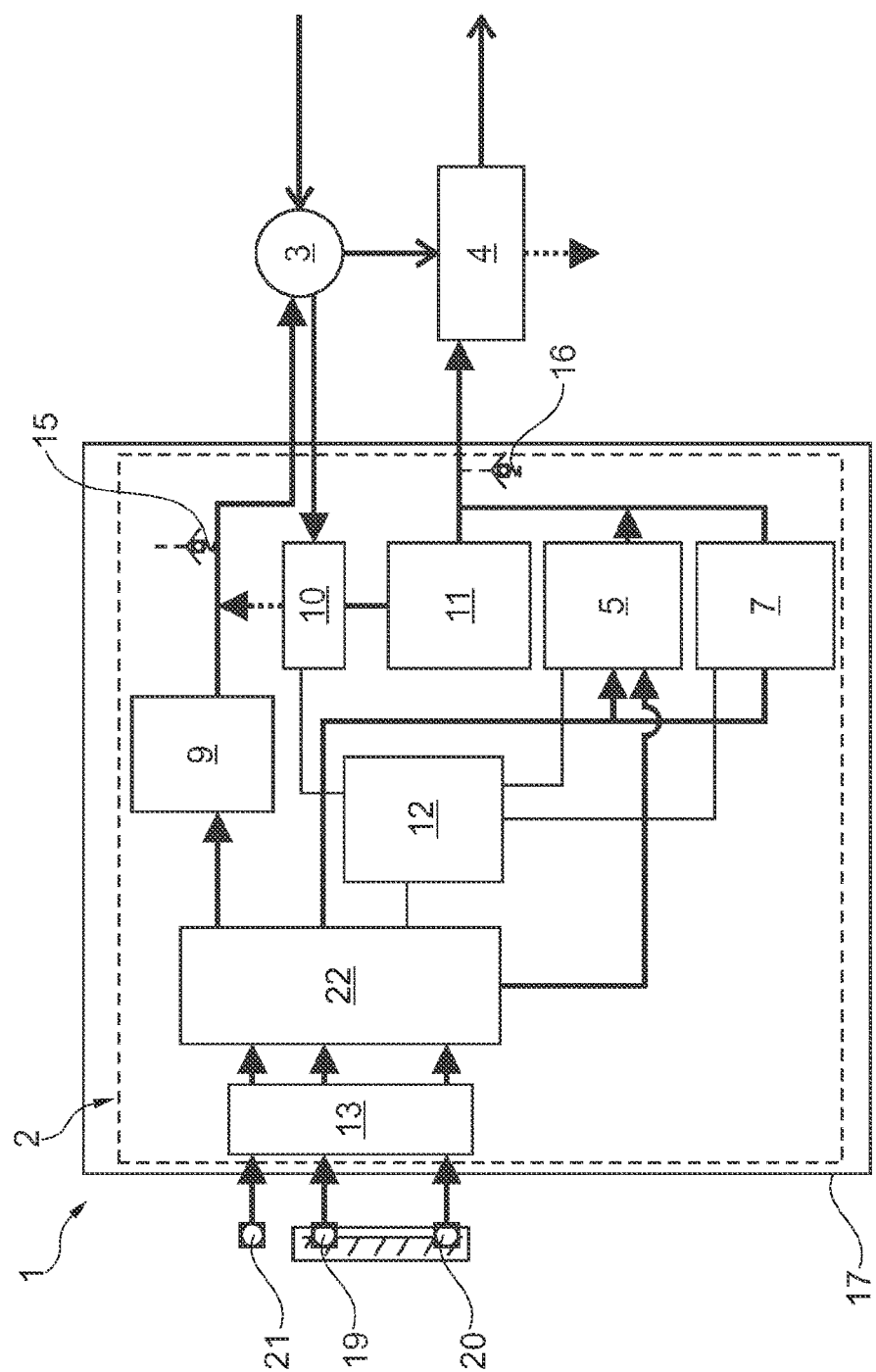

FIG. 3 shows a depiction of the heart-lung machine with the inventive control or regulating device 1 according to the first embodiment, wherein the control or regulating device 1 is operated in a second operating mode. The second operating mode can be selected wherein the user activates the selection device 12 appropriately, in particular by turning a knob of the selection device 12 into a corresponding position.

In FIG. 3, the lines through which a gas flows are shown with an arrow. In the second operating mode, the further switching device 22 is in a first switch position, wherein the first or third source 19, 21 and the second source 20 are fluidically connected to the mixing device 5. The composition and/or the volumetric flow of the gas flowing out of the mixing device 5 is controlled or regulated by means of the adjusting device 6. The gas flowing out of the mixing device 5 flows through the gas exchange unit 4 and is then released into the environment, as indicated by the dotted arrow.

Furthermore, in the second operating mode, oxygen flows to the blood pump 3 and from there back to the control or regulating device 1. The volumetric flow of the oxygen flowing to the blood pump 3 can be controlled or regulated by means of the other adjusting device 9. In contrast to the first operating mode, the switching device 10 is in the other switch position, wherein the blood pump 3 and the gas exchange unit 4 are not fluidically connected together by means of the switching device 10. This means that the oxygen flowing from the blood pump 3 is released to the environment, as indicated by the dotted arrow.

In the second operating mode, no gas flows through the further mixing device 7. Furthermore, gas flowing out of the mixing device 5 is supplied to the gas exchange unit 4 exclusively.

Figure 4:
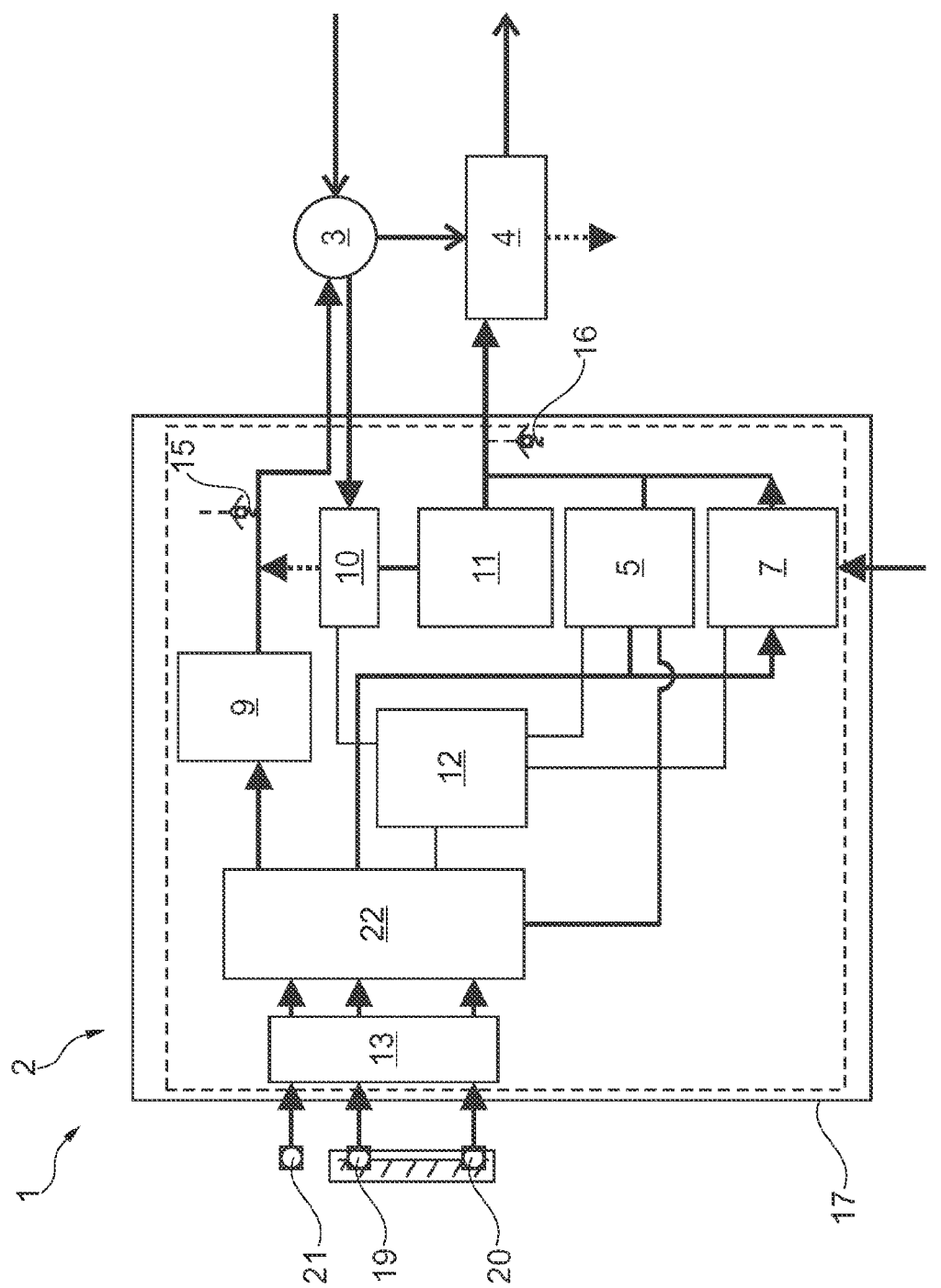

FIG. 4 shows a depiction of the heart-lung machine with the inventive control or regulating device 1 according to the first embodiment, wherein the control or regulating device 1 is operated in a third operating mode. The third operating mode can be selected, wherein the user activates the selection device 12 appropriately, in particular by turning a knob of the selection device 12 into a corresponding position.

In FIG. 4, the lines through which a gas flows are shown with an arrow. In the third operating mode, the further switching device 22 is in the second switch position, wherein the further mixing device 7 is fluidically connected to the first source 19. Furthermore, ambient air is supplied to the further mixing device 7, as indicated by the arrow. The gas flowing out of the further mixing device 7 is supplied to the gas exchange unit 4.

Otherwise, there are no differences from the second operating mode. Now, the switching device 10 is in the other switch position, so that the oxygen flowing out of the blood pump 3 is released to the environment.

Figure 5:
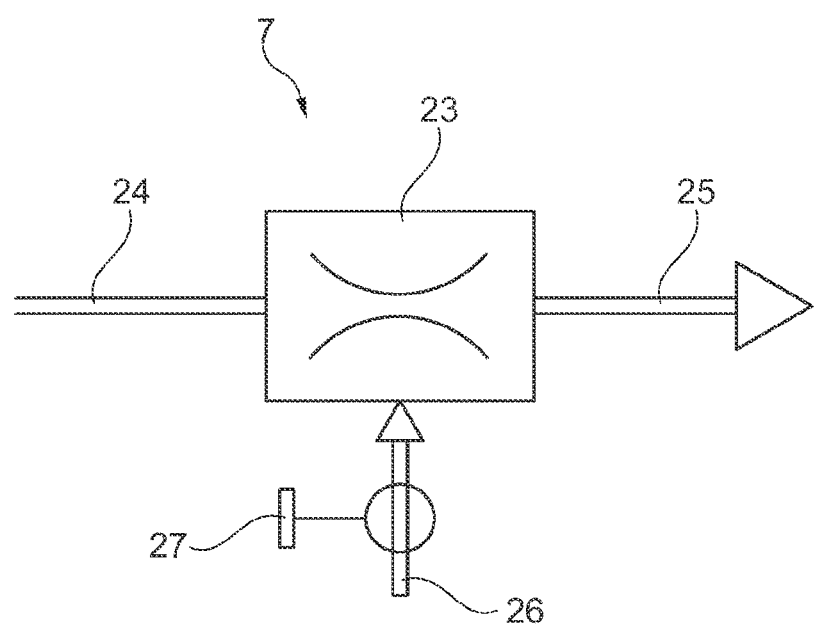

FIG. 5 shows a depiction of the further mixing device 7. It can be seen from FIG. 5 that the further mixing device 7 has a venturi element 23. The venturi element 23 is fluidically connected by means of a first line 24 to the first source 19 or to the third source 21. Furthermore, the venturi element 23 is fluidically connected by means of a second line 25 to the gas exchange unit 4. Also, the venturi element 23 can be fluidically connected to the environment by means of a third line 26.

The further mixing device 7 has a valve 27 by means of which an adjustment can be made whether ambient air is supplied to the venturi element 23 through the third line 26.

Figure 6:
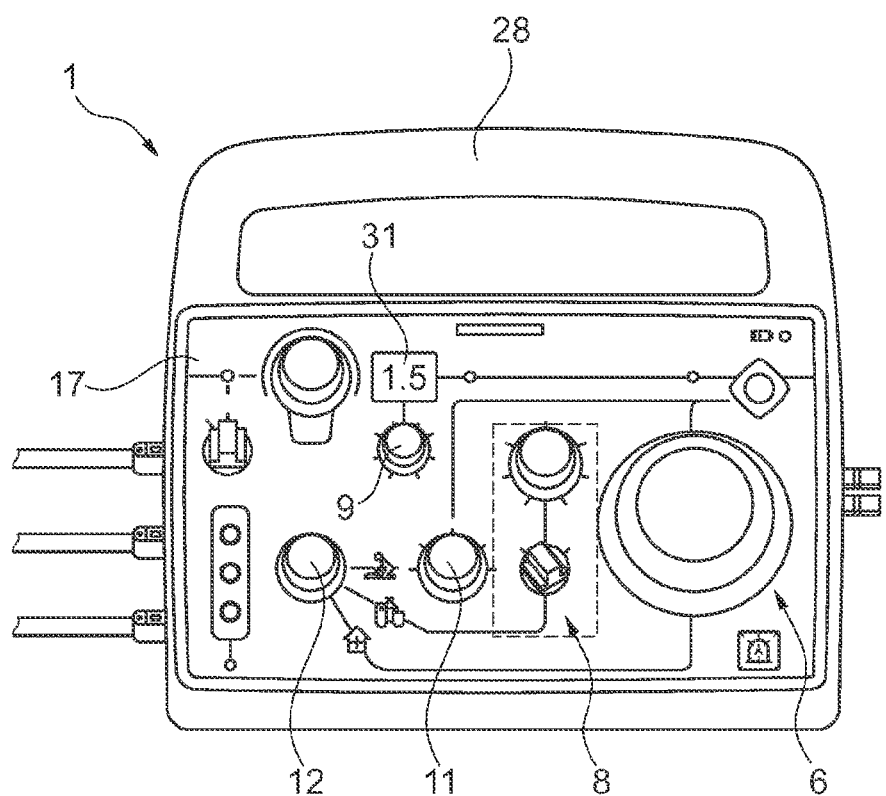

FIG. 6 shows a depiction of the inventive control or regulating device 1 according to a second embodiment. The embodiment differs from the embodiment shown in FIG. 1 in that the control or regulating device 1 has a handle 28, which is made in one piece with the housing 17. The control or regulating device 1 has an indicator 31 by means of which, for example, the volumetric gas flow values can be indicated.

Figure 7:
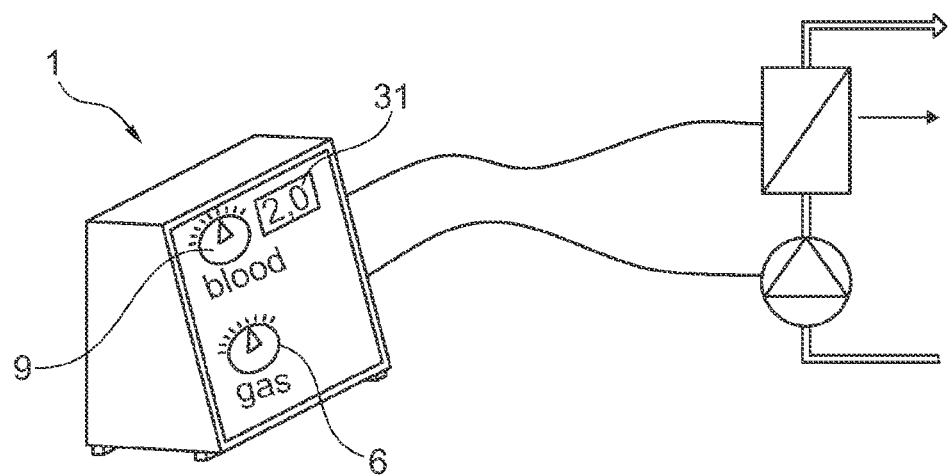

FIG. 7 shows a depiction of the heart-lung machine with the inventive control or regulating device 1 according to a third embodiment. The control or regulating device 1 differs from the control or regulating device 1 illustrated in FIG. 1 in that the control or regulating device 1 simply has the adjusting device 6 to control or regulate the volumetric flow of the gas supplying the gas exchange unit 4 and the other adjusting device 9 by means of which the volumetric flow of the gas supplying the blood pump 3 is controllable. Therefore, the control or regulating device 1 has no further adjusting device 7.

Figure 8:
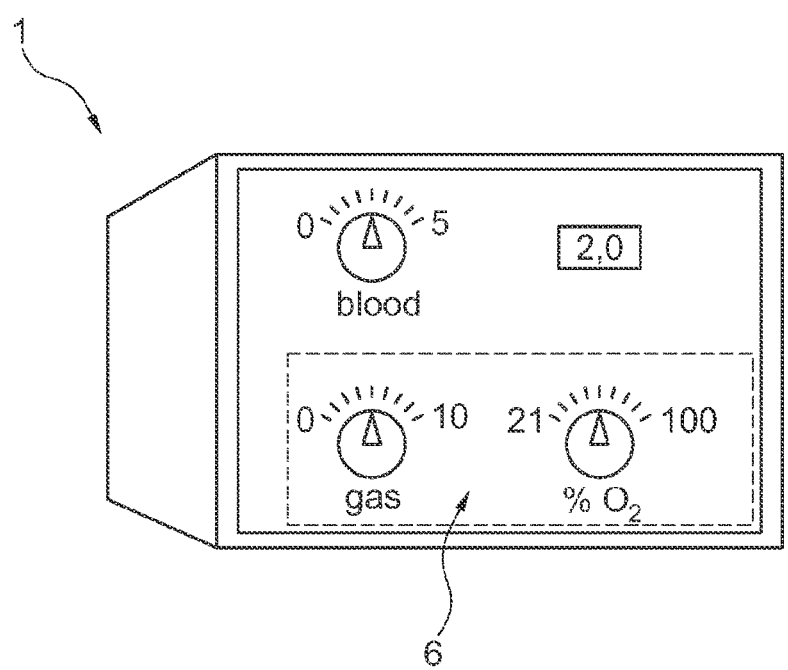

FIG. 8 shows a depiction of the inventive control or regulating device 1 according to a fourth embodiment. It differs from the embodiment shown in FIG. 7 in that the composition of the gas flowing out of the mixing device 5 is also adjustable by means of the adjusting device 6. In particular, the concentration of oxygen of the gas flowing out of the mixing device 5 can be adjusted.

Figure 9:
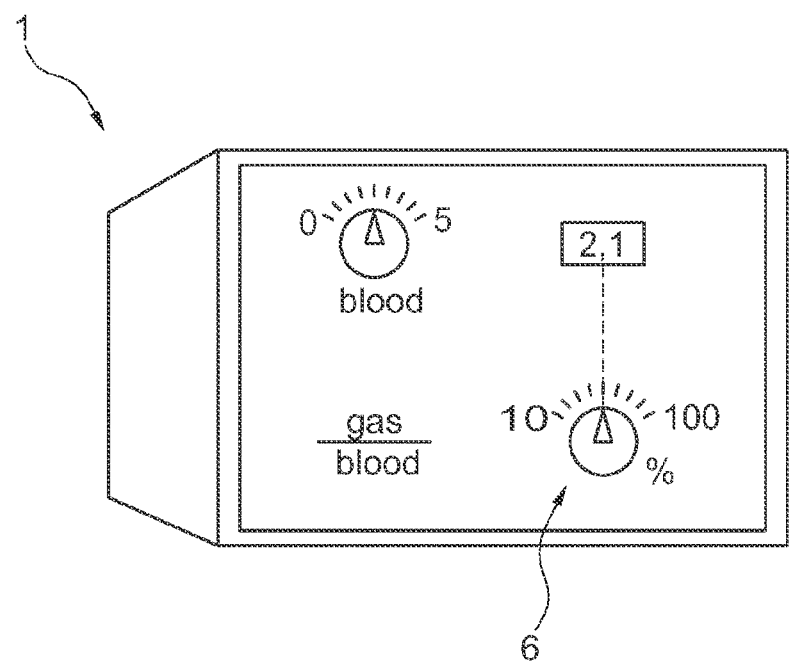

FIG. 9 shows a depiction of the inventive control or regulating device 1 according to a fifth embodiment. It differs from the embodiment shown in FIG. 7 in that a relationship between the volumetric gas flow and the volumetric blood flow is adjustable by means of the adjusting device 6. Depending on the adjusted relationship, the volumetric gas flow flowing through the mixing device 5 and/or the volumetric gas flow supplying the blood pump 3 is controlled or regulated in order to achieve the desired relationship.

Figure 10:
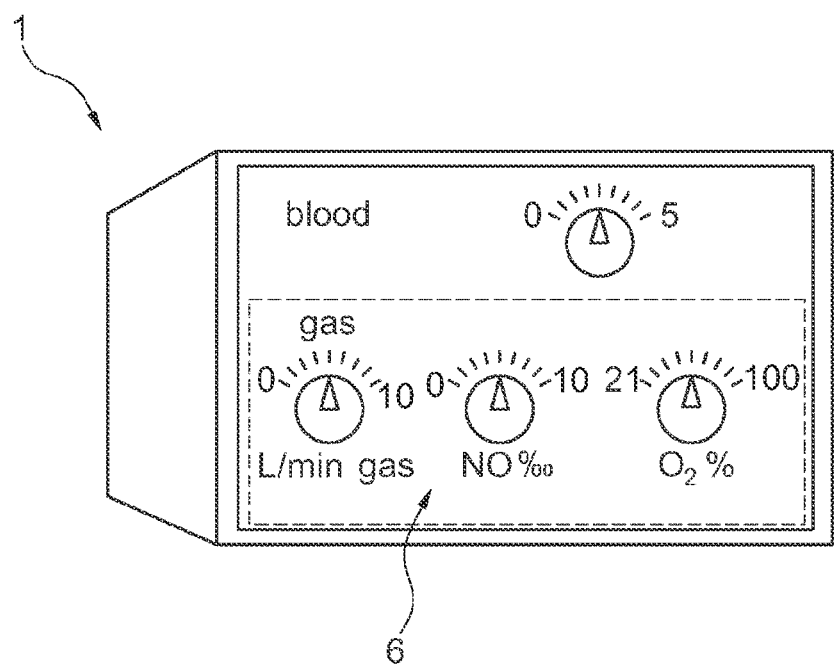

FIG. 10 shows a depiction of the inventive control or regulating device 1 according to a sixth embodiment. This embodiment differs from the embodiment shown in FIG. 8, in that the concentration of nitrogen monoxide in the gas flowing out of the mixing device 5 can also be adjusted by means of the adjusting device 6. With this embodiment, the mixing device 5 is also fluidically connected to a fourth source which has the nitrogen monoxide.

Figure 11:
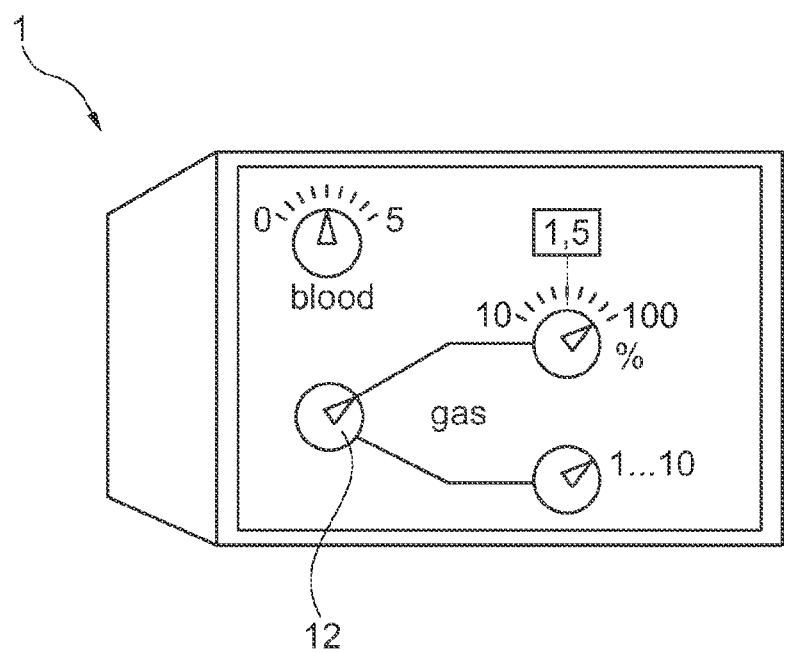

FIG. 11 shows a depiction of the inventive control or regulating device 1 according to a seventh embodiment. The embodiment differs from the embodiment shown in FIG. 1 in that, by means of the control or regulating device 1, just two operating modes can be implemented by means of the selection device 12.

Figure 12:
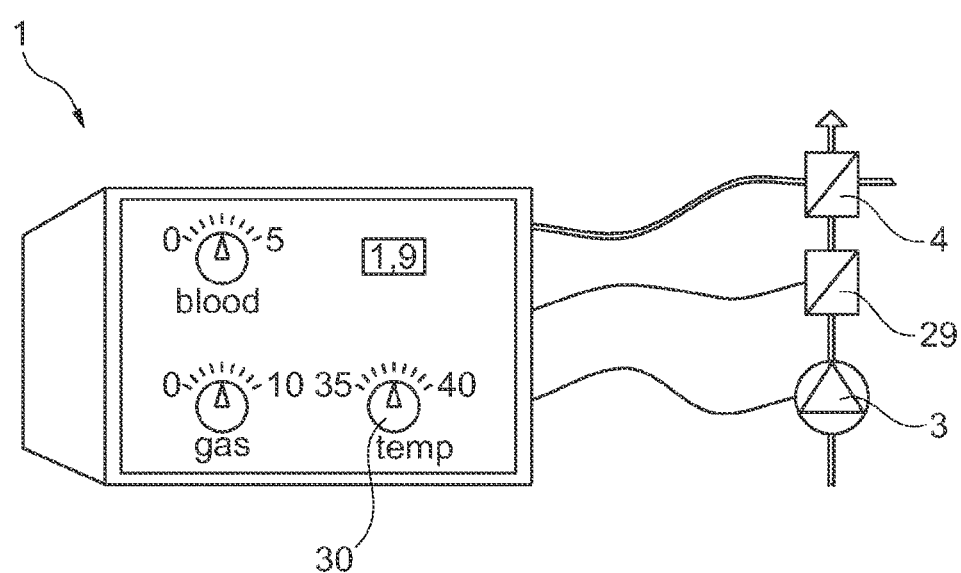

FIG. 12 shows a depiction of the inventive control or regulating device 1 according to an eighth embodiment. The embodiment differs from the embodiments described above in that the control or regulating unit 2 also serves to control or regulate heating 29 in the heart-lung machine. The heating 29 serves to heat up the blood removed from the patient.

The heating 29 is disposed in the flow sense between the blood pump 3 and the gas exchange unit 4. The control or regulating unit 2 has an adjusting element 30 by means of which the user can control or regulate the desired temperature of the blood.

Figure 13:
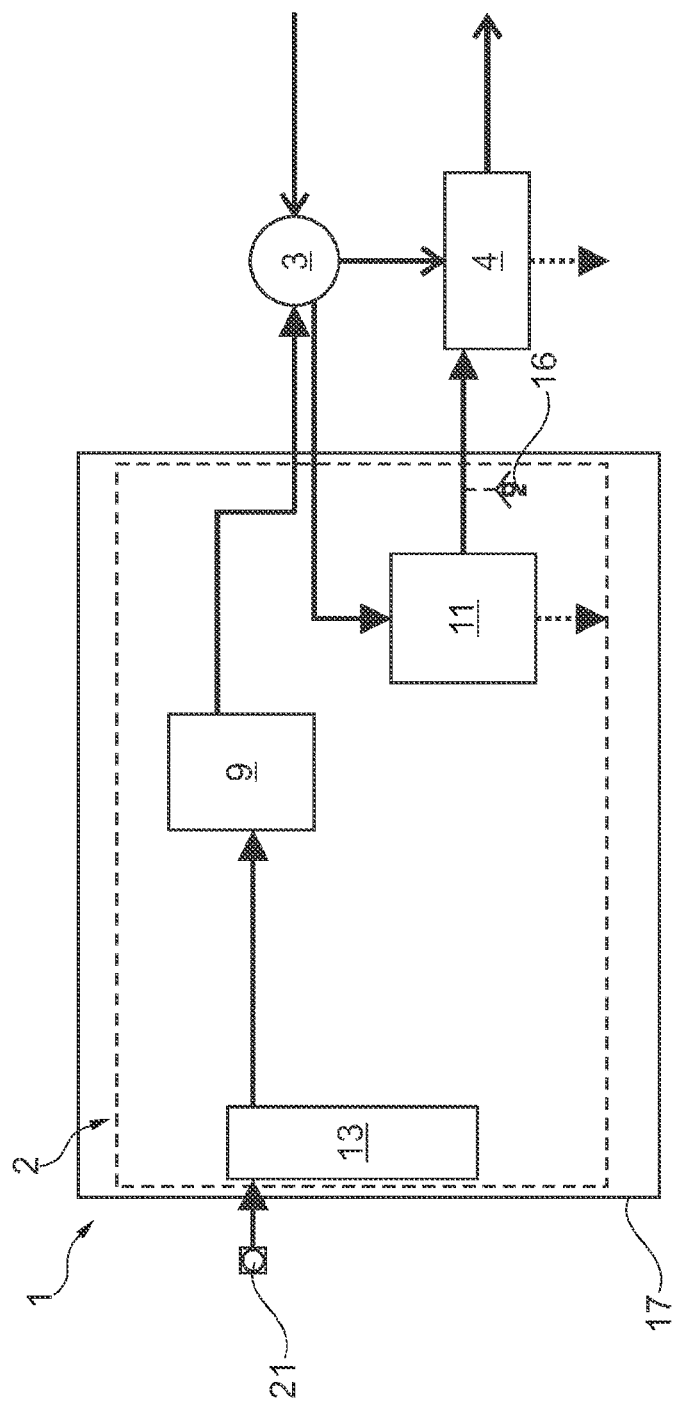

FIG. 13 shows a depiction of the heart-lung machine with the inventive control or regulating device 1 according to a ninth embodiment. The embodiment shown in FIG. 13 differs from the embodiment shown in FIG. 1 in that its construction is simpler than the embodiment shown in FIG. 1. Here, the control or regulating device 1 has the other adjusting device 9 and the other switching device 11.

The other adjusting device 9 is fluidically connected to the third source 21 and the blood pump 3 by means of the gas connection unit 13. In particular, the volumetric gas flow supplying the blood pump 3 and therefore the volumetric blood flow flowing through the blood pump 3 can be adjusted by means of the other adjusting device 9. The supplied gas can be oxygen.

The switching device 11 is fluidically connected to the blood pump 3 and the gas exchange unit 4. In this, the switching device 11 is connected downstream in a flow sense to the blood pump 3. The switching device 11 is arranged such that a part of the gas coming from the blood pump can be released to the environment. The remaining gas is supplied to the gas exchange unit 4 and then released to the environment.

The gas released to the environment is illustrated in each case by a dotted arrow.

Figure 14:
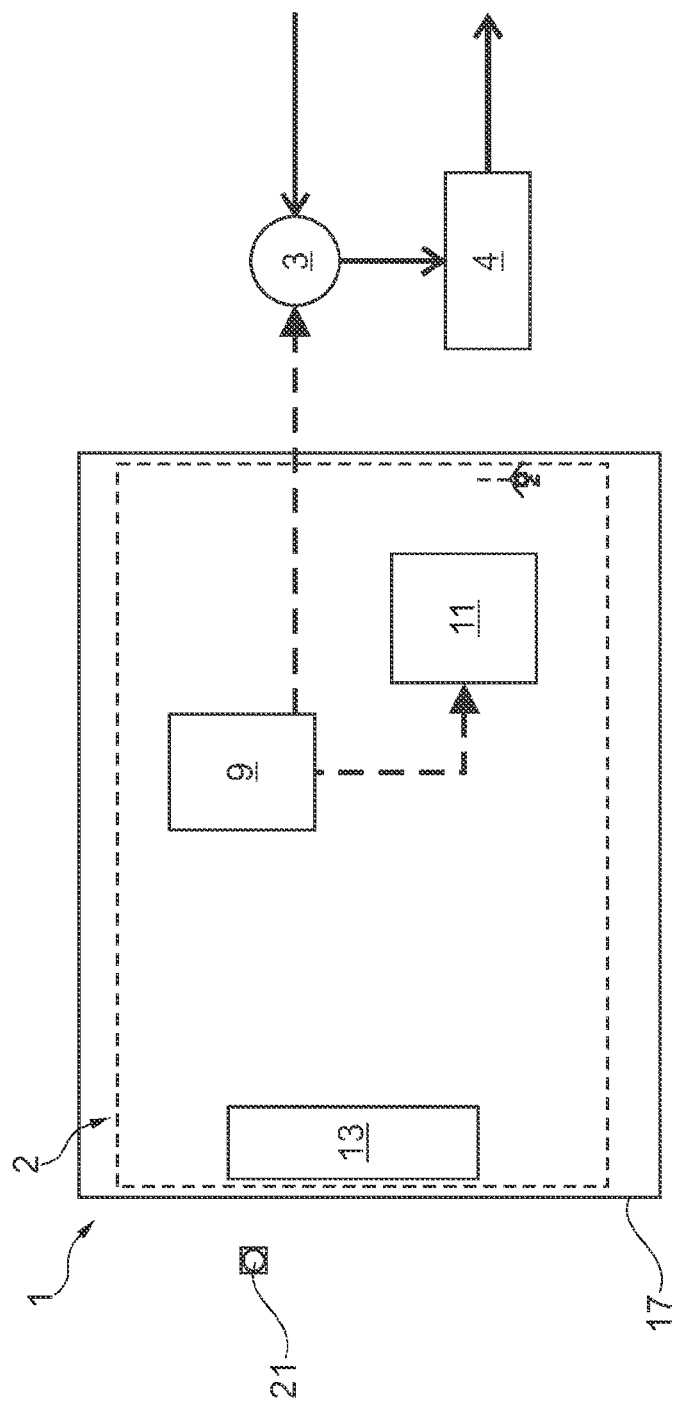

FIG. 14 shows the control or regulating device 1 according to the ninth embodiment in which the fluidic connections are not indicated. The user of the control or regulating device 1 can adjust the volumetric blood flow by operating the other adjusting device 9, which is illustrated by a dotted arrow. More specifically, it is possible to use the other adjusting device 9 to adjust the volumetric gas flow supplying the blood pump 3, by which in turn the volumetric blood flow is adjusted. The position of the other adjusting device 9 is transmitted to the other switching device 11, which is illustrated by the dotted arrow.

The control or regulating device 1 controls or regulates the gas flow through the gas exchanger 4 by means of the other switching device 11. To do this, the user of the control or regulating device 11 can adjust the gas flow by operating the other switching device 11. In particular, several control curves of gas flow can be stored. By operating the other switching device 11, the user can set a desired control curve and thereby adjust the gas flow through the gas exchange unit 4.

As a consequence, in this embodiment the volumetric blood flow is specified by the user by operating the other adjusting device 9. Depending on the volumetric blood flow, the control or regulating device 1 controls or regulates the gas flow through the gas exchange unit 4, in particular via the other switching device 11.

Figure 15:
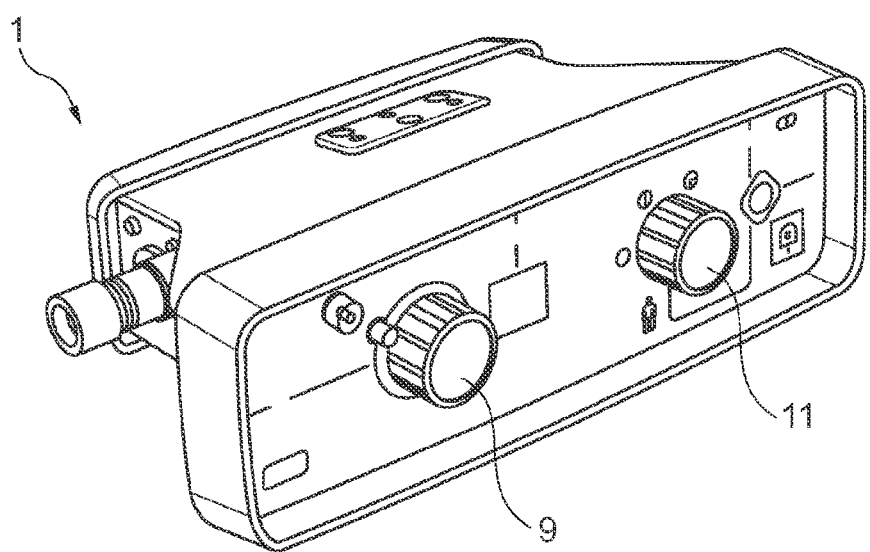

FIG. 15 shows a perspective view of the control or regulating device 11 according to the ninth embodiment. Here, FIG. 15 shows that the other adjusting device 9 and the other switching device 11 are each made with a control knob.

REFERENCE LIST

1 Control or regulating device
2 Control or regulating unit
3 Blood pump
4 Gas exchange unit
5 Mixing device
6 Adjusting device
7 Further mixing device
8 Further adjusting device
9 Other adjusting device
10 Switching device
11 Switch adjusting device
12 Selection device
13 Gas connection unit
15 Pressure control valve
16 Other pressure control valve
17 Housing
19 First source
20 Second source
21 Third source
22 Further switching device
23 Venturi element
24 First line
25 Second line
26 Third line
27 Valve
28 Handle
29 Heating
30 Adjusting element
31 Indicator
32 Electrical line

The invention claimed is:

1. A control or regulating device (1) with a control or regulating unit (2), which both controls or regulates a volumetric blood flow flowing through a blood pump (3) as well as a volumetric flow of a gas able to flow through a gas exchange unit (4), wherein the control or regulating device (1) has a housing (17), and wherein the control or regulating unit (2) is disposed fully inside a cavity of the housing (17), wherein the control or regulating unit (2) has a mixing device (5), in which at least two gases can be mixed together, wherein the control or regulating unit (2) has an adjusting device (6) to control or regulate the volumetric flow and/or a composition of the gas flowing out of the mixing device (5), and wherein the control or regulating unit (2) has another adjusting device (9) configured to control or regulate a volumetric flow of the gas supplied to the blood pump (3).

2. A control or regulating device (1) according to claim 1, characterised in that the control or regulating unit (2) can be arranged in such a way and be intended, in controlling or regulating the volumetric flow of blood, to drive, electrically and/or pneumatically, the blood pump (3).

3. A control or regulating device (1) according to claim 1, characterised in that
   a. the control or regulating unit (2) controls or regulates the volumetric gas flow depending on the preadjusted, volumetric blood flow in particular automatically, and/or that
   b. the control or regulating unit (2) controls or regulates the volumetric blood flow and/or the volumetric gas flow such that a defined relationship can be set between the volumetric gas flow and the volumetric blood flow, and/or that
   c. the control or regulating unit (2) controls or regulates the volumetric blood flow and/or the volumetric gas flow such that a temporally changeable or relationship between the volumetric gas flow and the volumetric blood flow that can be influenced by measurement parameters can be adjusted, and/or that
   d. when the volumetric blood flow is changed, the control or regulating unit (2) is able to control or regulate the volumetric gas flow automatically to a value in keeping with the volumetric blood flow, and/or that
   e. when switching on the blood pump (3), the control or regulating unit (2) simultaneously controls or regulates the volumetric gas flow to a value which is associated with the volumetric blood flow.

4. A control or regulating device (1) according to claim 1, characterised in that at least one algorithm is stored which controls or regulates the relationship of volumetric gas flow and volumetric blood flow, depending on time and on other measurement parameters.

5. A control or regulating device (1) according to claim 1, characterised in that
   in the mixing device oxygen can be mixed with air and/or a gas.

6. A control or regulating device (1) according to claim 1, characterised in that
   a. the control or regulating unit (2) has a further mixing device (7) for mixing gas and ambient air or that
   b. the control or regulating unit (2) has a further mixing device (7) for mixing gas and ambient air, wherein the further mixing device (7) has a venturi element.

7. A control or regulating device (1) according to claim 1, characterised in that the control or regulating unit (2) has a further adjusting device (8) by means of which the a volumetric flow and/or a composition of the gas flowing out of a further mixing device (7) can be controlled or regulated.

8. A control or regulating device (1) according to claim 1, characterised in that the control or regulating unit (2)
   a. has a switching device (10) which is fluidically connected to the blood pump (3) and can be fluidically connected to the gas exchange unit (4), wherein, at one switch position the blood pump (3) is fluidically connected by means of the switching device (10) to the gas exchange unit (4) and/or, at another switch position, the blood pump (3) is fluidically connected by means of the switching device (10) to the environment, and/or that
   b. has a switching device (10) which is fluidically connected to the blood pump (3) and can be fluidically connected to the gas exchange unit (4), wherein the control or regulating unit (2) has a switch adjusting device (11) to control or regulate the volumetric flow of the gas which can be supplied from the switching device (10) to the gas exchange unit (4).

9. A control or regulating device (1) according to claim 1, characterised in that the control or regulating unit (2) has a selection device (12) by means of which the optionally different operating modes of the control or regulating device (1) can be adjusted.

10. A control or regulating device (1) according to claim 9, characterised in that, by means of the selection device (12)
    a. a first operating mode can be set in which the switching device (10) is in the switch position wherein the same gas can be supplied to both the blood pump (3) as well as to the gas exchange unit (4), or
    b. a second operating mode can be set wherein the switching device (10) is in the other switch position and wherein the gas flowing out of the mixing device (5) can be supplied to the gas exchange unit (4), or
    c. a third operating mode can be set wherein the switching device (10) is disposed in the other switch position and wherein the gas flowing out of a further mixing device (7) can be supplied to the gas exchange unit (4).

11. A control or regulating device (1) according to claim 1, characterised by
    a. having a safety device for monitoring an operation of the control or regulating device and/or by
    b. a safety device for issuing an alarm if the volumetric flow of the gas supplied to the gas exchange unit falls below a threshold value.

12. A control or regulating device (1) according to claim 1, characterised in that the control or regulating unit (2)
    a. has a monitoring device to monitor the patient's vital parameters and/or that
    b. the temperature of the blood can be controlled and regulated by means of the control or regulating unit (2).

13. A control or regulating device (1) according to claim 1, characterised in that the control or regulating unit (2) has a gas connection unit (13), which
    a. is fluidically connectable to a gas source or to several gas sources and/or which
    b. is fluidically connectable to the mixing device (5) and/or to a further mixing device (7) and/or to the other adjusting device (9).

14. A control or regulating device (1) according to claim 13, characterised in that the control or regulating unit (2) has a further switching device (22),
    a. by means of which the gas connection unit (13) optionally is fluidically connectable to the mixing device (5) or to the further mixing device (7) and/or
    b. which can be configured such that, if a gas source fails, the control or regulating device (1) switches automatically to another gas source.

15. A control or regulating device (1) according to claim 1, characterised in that the control or regulating unit
    a. has a pressure control valve (15) to prevent too high a volumetric gas flow from being supplied to the blood pump (3), and/or
    b. has another pressure control valve (16) to prevent too high a volumetric gas flow from being supplied to the gas exchange unit (4).

16. A control or regulating device (1) according to claim 1, characterised in that the control or regulating device (1) has a housing (17), wherein
    the housing (17) has a handle (28).

17. A control or regulating device (1) according to claim 1, characterised in that the control or regulating device (1) is configured as a portable device.

18. A heart-lung machine with a blood pump (3), a gas exchange unit (4) and a control or regulating device (1) according to claim 1.

* * * * *